Nov. 12, 1935.   H. F. JOHNSON   2,020,554
PIPE COUPLING
Filed Oct. 30, 1933
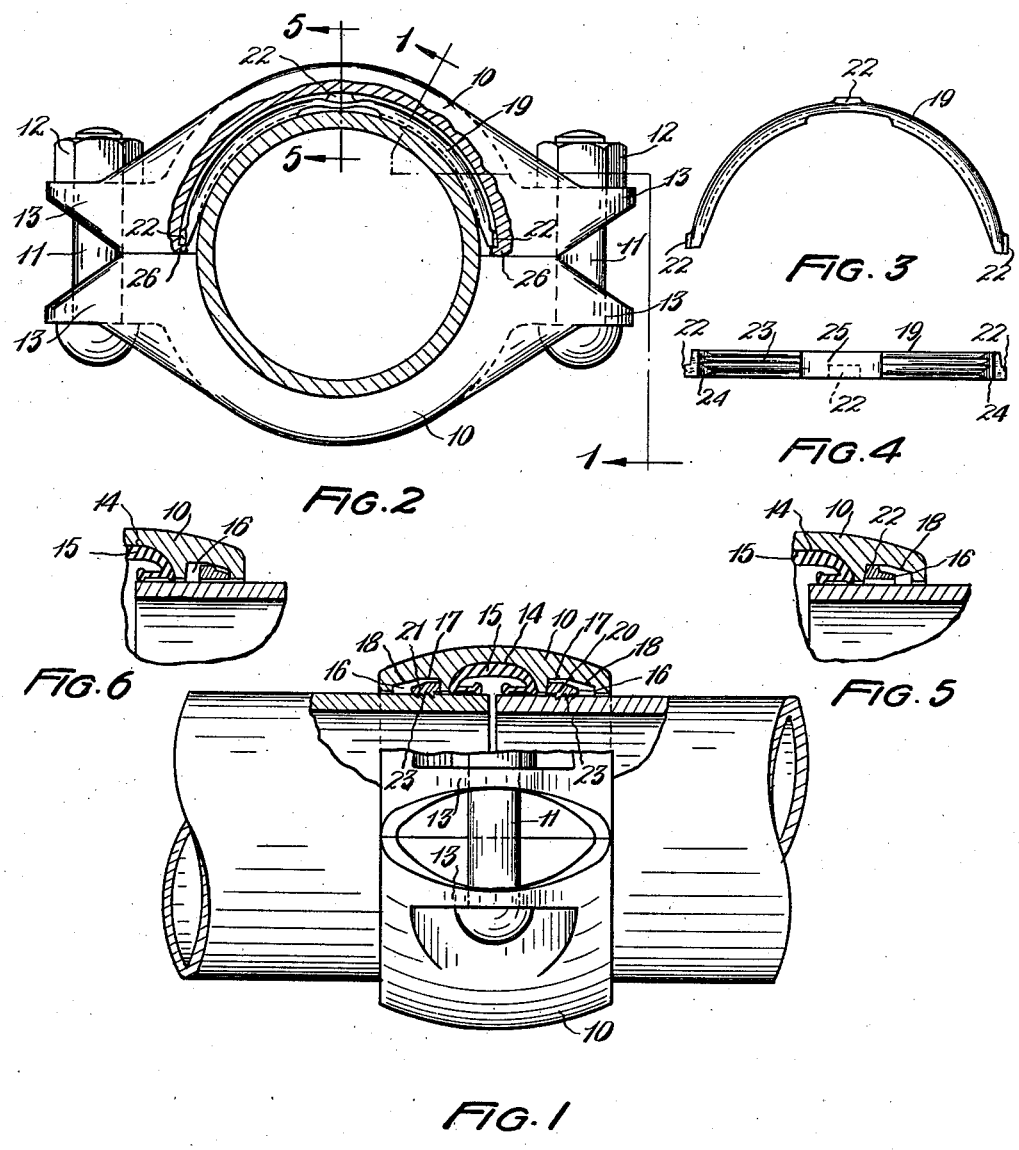
INVENTOR:
HOWARD F. JOHNSON
Kwis Hudson & Kent
ATTORNEYS.

Patented Nov. 12, 1935

2,020,554

UNITED STATES PATENT OFFICE 2,020,554

PIPE COUPLING

Howard F. Johnson, Cleveland, Ohio, assignor to The Champion Machine & Forging Company, Cleveland, Ohio, a corporation of Ohio Application October 30, 1933, Serial No. 695,830

13 Claims. (Cl. 285—194)

This invention relates to a coupling such as is used to connect the juxtaposed ends of adjacent pipe sections of a pipe line.

The principal object of the invention is to provide a coupling of the character specified and having improved means as a part thereof which will permit an amount of movement of the pipe sections in the coupling housing sufficient to take care of the movement of expansion or contraction in the pipe line, but will prevent excessive movement of the pipe sections in the housing, such as would cause a separation of the sections from the coupling.

A more specific object is to provide a pipe coupling having means for initially gripping the pipe sections to which it is applied with a relatively light spring gripping action, but which, upon movement of the pipe sections in the coupling housing in excess of a predetermined amount, will quickly increase its gripping action to prevent separation of the pipe sections from the coupling.

Another object is to provide a pipe coupling including a housing having associated therewith pipe gripping means which are separate from the housing, but which can be applied to the pipe sections simultaneously with the housing.

A further object is to provide a pipe coupling including a housing having spring pipe gripping means associated therewith which are so constructed that the gripping means may be sprung into assembled position in the housing and held therein by its own resilience prior to mounting the coupling upon pipe sections of a pipe line.

Further and additional objects and advantages will become apparent hereinafter during the detailed description which is to follow of an embodiment of the invention, which embodiment is illustrated in the accompanying drawing wherein:

Figure 1 is a side elevational view partly in section and shows the pipe coupling mounted upon the juxtaposed ends of adjacent pipe sections of a pipe line; this view being taken substantially on line 1—1 of Fig. 2, looking in the direction of the arrows;

Fig. 2 is an end elevational view of the coupling shown in Fig. 1, the pipe section being shown in cross-section and a certain portion of the upper half of the coupling housing being broken away and shown in section to illustrate the pipe gripping means arranged therein;

Figs. 3 and 4 are detail elevational and bottom plan views, respectively, of the pipe gripping means;

Fig. 5 is a fragmentary sectional view taken substantially on line 5—5 of Fig. 2, looking in the direction of the arrows and shows the position of the pipe gripping means before the pipe sections have moved in the coupling housing, and Fig. 6 is a view similar to Fig. 5, but illustrates the position of the pipe gripping means after movement of the pipe sections has occurred in the coupling housing.

Although the present invention may be applied to various types of pipe couplings it will be shown and described herein by way of example as applied to a pipe coupling of the type wherein a double-U gasket is mounted in the housing and the interior of the gasket is in communication with the interior of the pipe line, so as to be subject to pipe line pressures.

Referring to the accompanying drawing it will be seen that the coupling housing is formed of two substantially semi-circular sections 10 adapted to be positioned around the juxtaposed ends of adjacent pipe sections and to be clamped thereon by means of bolts 11 and nuts 12, said bolts passing through aligned openings formed in cooperating ears or lugs 13 at the ends of the housing sections 10 and projecting laterally of the housing. When the housing sections 10 are mounted upon the ends of adjacent pipe sections of a pipe line, as has been stated, it will be seen that said housing sections form a continuous housing embracing the pipe sections. The housing sections are provided intermediate their longitudinal edges with recesses 14 which, when the sections are mounted upon the pipes, form a continuous annular recess in which the gasket 15 can be arranged.

Although various forms of gaskets can be mounted in the housing, the gasket 15, shown herein, has inwardly extending flanges which grip the pipe ends, while the interior of the gasket is in communication with the interior of the pipes, wherefore the flanges of the gasket will be subject to line pressure and thus be held in close engagement with the pipes and provide an effective seal. Since the construction of the gasket per se forms no part of the present invention further reference thereto is unnecessary.

The housing sections 10 are provided on opposite sides of the recess 14 with recesses 16 which, when the housing sections are assembled upon a pipe line, form substantially continuous circular recesses upon the opposite sides of the gasket containing recess. The recesses 16 have their bottom wall formed of two angularly disposed portions, the portion 17 being located adjacent the recess 14 and extending substantially parallel to the outer surface of the pipe sections, while the portion 18 extends from the portion 17 toward the outer sides of the recesses 16 and are directed angularly inwardly toward the pipe sections, thus providing the recesses 16 with tapered portions.

Arcuate pipe gripping members 19, preferably substantially semi-circular, are mounted in the recesses 16, such members having their outer surfaces formed with two angularly disposed portions 20 and 21, similar to the portions 17 and 18 of the bottom wall of the recesses 16. It should be noted, however, that the thickness of the gripping members 19 is such that the portions 20 and 21 of their outer surfaces do not contact with the portions 17 and 18 of the bottom wall of the recesses 16.

The gripping members 19 are provided on the portions 20 of their outer surfaces with a plurality of outwardly extending spaced apart projections 22 adapted, when the members are mounted in the recesses 16 to engage the portions 17 of the bottom wall of the recesses 16. A preferable arrangement for the projections 22 is to provide projections at each end of the gripping members 19 and a projection midway of the ends thereof, as clearly shown in Figs. 3 and 4.

The under side of the gripping members 19 is provided with parallel arcuate teeth 23 extending longitudinally of the members; it being noted, however, that the under sides of the members are provided also with smooth portions 24 at each end of the members and smooth arcuate portions 25 intermediate the ends thereof, while the gripping members 19 are of reduced thickness adjacent the portions 24 and 25.

The gripping members 19 are formed of spring metal and are assembled in the recesses 16 of the housing sections 10 by being sprung into position in the recesses with the opposite ends of the members engaging peened-over portions 26 of the housing section, wherefore, the gripping members are held in assembled position in the recesses 16 by their own resiliency and by the peened-over portions 26 of the housing sections. The engagement of the projections 22 with the portions 17 of the recess deflect the thin sectioned portions of the gripping members adjacent to the smooth portions of their under sides and place the members under spring tension, this deflection being shown in an exaggerated manner in Fig. 2.

When the coupling is arranged on the juxtaposed ends of adjacent pipe sections, as shown in Fig. 1, initially the teeth 23 of the gripping members will lightly bite into the pipes, since the projections 22 engage the portions 17 of the bottom walls of the recesses 16 at the point of greatest depth of the recesses and the gripping members are allowed to exercise their inherent spring tendency to expand in the recesses 16.

It is necessary in pipe coupling construction that movement of the pipes in the coupling be permitted sufficient to compensate for the thermal expansion and contraction of the pipes. It has been found that where toothed gripping members are arranged in recesses in the coupling housing and contact with the bottom wall of the recesses throughout substantially the entire outer surface of the gripping members the frictional engagement between the members and the bottom wall of the recess is so great as to prevent relative movement between the gripping members and the housing, with the result that such a construction provides for no movement of the pipes in the housing and consequently does not take care of the movements of the pipes caused by expansion or contraction thereof.

In the present invention, however, the gripping members only engage the bottom wall of the recesses over relatively small areas, that is, the combined area of the projections 22 and hence the friction between the gripping members and the coupling housing is insufficient to prevent relative movement therebetween when the pipes initially move in the housing thus allowing for expansion and contraction of the pipes.

It is necessary, however, that means be provided in a pipe coupling of this character to prevent excessive movement of the pipe ends in the housing. It will be seen that when the pipe ends initially move in the housing the gripping members 19 will be capable of moving with the pipes until the projections 22 on the members engage with the portions 18 of the bottom wall of the recesses 16. Further movement of the pipes in the housing causes the projections 22 to be pressed inwardly by the inclined or tapered portions 18 of the recess wall (see Fig. 6) with the result that the gripping members are contracted into tighter gripping engagement with the pipe wall and at the same time the frictional engagement between the projections 22 and the portions 18 of the recess wall increases so that the pipes, the gripping members and the housing are held against movement relative to each other except when the pipes move inwardly with respect to the housing.

From the foregoing it will be noted that a coupling constructed in accordance with the present invention provides adequate means for preventing excessive movement of the pipes in the housing, while at the same time allowing sufficient movement to take care of the expansion and contraction of the pipes. This result is accomplished by providing the relatively small area of engagement between the gripping members and the housing so as to keep the friction therebetween sufficiently low to allow the gripping members to move relative to the housing initially, but which is increased by the tapered portions of the housing to prevent movement between the housing and the pipes, that is, in excess of that required for expansion and contraction. It will also be noted that since the gripping members are sprung into position in the housing that they are applied to the pipes simultaneously with the housing as distinguished from those forms of couplings wherein the gripping members must be applied to the pipes prior to the application of the housing thereto.

Although a preferred embodiment of the invention has been illustrated and described herein it should be understood that the invention is susceptible of various modifications and adaptations within the scope of the appended claims.

Having thus described my invention, I claim:

1. In a pipe coupling, a coupling housing having a recess in its under side, and a pipe gripping member arranged in said recess and provided with means on its outer side formed to contact the bottom wall of said recess at a plurality of spaced points of relatively small area and to be out of contact therewith over a relatively large area.

2. In a pipe coupling, a coupling housing having a recess in its under side, and a pipe gripping member arranged in said recess and having a plurality of spaced projections contacting the bottom wall of said recess, said member being spaced from said bottom wall intermediate said projections.

3. In a pipe coupling, a coupling housing having a recess in its under side, said recess having a bottom wall formed of angularly disposed portions one of which is substantially parallel to the pipes to which the coupling is applied and another of which is inclined inwardly toward the pipes, and a pipe gripping member arranged in said recess and formed to contact the bottom wall of said recess at a plurality of spaced points of relatively small area and to be out of contact therewith over a relatively large area.

4. In a pipe coupling, a coupling housing having a recess in its under side, said recess having a bottom wall formed of angularly disposed portions one of which is substantially parallel to the pipes to which the coupling is applied and another of which is inclined inwardly toward the pipes, and a pipe gripping member arranged in said recess and having a plurality of spaced projections contacting the bottom wall of said recess, said member being spaced from said bottom wall intermediate said projections.

5. In a pipe coupling, a coupling housing having a recess in its under side, and a pipe gripping member arranged in said recess, said member and said recess having cooperating portions forming a plurality of circumferentially spaced relatively small contacting areas between the member and the bottom wall of the recess and relatively large non-contacting areas between the contacting areas.

6. In a pipe coupling, a coupling housing having a recess in its under side, said recess having a bottom wall formed of angularly disposed portions one of which is substantially parallel to the pipes to which the coupling is applied and another of which is inclined inwardly toward the pipes, and a pipe gripping member arranged in said recess, said member and the bottom wall of said recess having cooperating means forming a plurality of circumferentially spaced relatively small contacting areas and relatively large noncontacting areas between the contacting areas.

7. In a pipe coupling, a coupling housing having a recess in its under side, and a pipe gripping member arranged in said recess, said member and the bottom wall of said recess having cooperating portions forming a plurality of relatively small contacting areas and relatively large non-contacting areas therebetween, said member being of reduced thickness adjacent the contacting areas.

8. In a pipe coupling, a coupling housing having a recess in its under side, and an arcuate spring pipe gripping member arranged in said recess, said member and the bottom wall of said recess having cooperating portions forming a plurality of relatively small contacting areas and relatively large non-contacting areas therebetween, said housing having means against which the ends of said member abut, whereby said member may be sprung into said recess and retained therein by its own resilience.

9. In a pipe coupling, a coupling housing having a recess in its under side, and an arcuate spring pipe gripping member arranged in said recess, said member and the bottom wall of said recess having cooperating portions forming a plurality of relatively small contacting areas and relatively large non-contacting areas therebetween, said member being of reduced thickness adjacent the said contacting areas, said housing having means against which the ends of said member abut, whereby said member may be sprung into said recess and retained therein by its own resilience.

10. In a pipe coupling, a housing having an arcuate recess in its under side the bottom wall of which is formed of angularly disposed portions one of which is substantially parallel to the pipe to which the coupling is applied and another of which is inclined inwardly toward the pipe and an arcuate spring gripping member arranged in said recess and having pipe engaging teeth on its inner side and a plurality of relatively small projections on its outer side engaging the bottom wall of said recess.

11. In a pipe coupling, a housing having an arcuate recess in its under side the bottom wall of which is formed of angularly disposed portions one of which is substantially parallel to the pipe to which the coupling is applied and another of which is inclined inwardly toward the pipe, and an arcuate spring gripping member arranged in said recess and having spaced portions of its inner side provided with pipe engaging teeth, said member adjacent the ends of said toothed portions being of reduced thickness and having on its outer side at such points relatively small projections engaging the bottom wall of said recess.

12. In a pipe coupling, a coupling housing having a recess in its underside, and an arcuate spring pipe gripping member arranged in said recess, said member being provided on its outer side with a plurality of spaced projections contacting the bottom wall of said recess wherefore a plurality of relatively small contacting areas and relatively large noncontacting areas are formed between the gripping member and the bottom wall of said recess, said housing having means against which the ends of said member abut whereby said member may be sprung into said recess and retained therein by its own resilience.

13. In a pipe coupling, a coupling housing having a recess in its underside, and an arcuate spring pipe gripping member arranged in said recess, said member being provided on its outer side with a plurality of spaced projections engaging the bottom wall of said recess wherefore a plurality of relatively small contacting areas and relatively large non-contacting areas are formed between said member and the bottom wall of said recess, said member being of reduced thickness adjacent the said contacting areas, said housing having means against which the ends of said member abut whereby said member may be sprung into said recess and retained therein by its own resilience.

HOWARD F. JOHNSON.